United States Patent
Tamaru et al.

(10) Patent No.: US 8,327,803 B2
(45) Date of Patent: Dec. 11, 2012

(54) METHOD FOR PROCESSING A LARGE NUMBER OF FISH EGGS

(75) Inventors: Yutaka Tamaru, Tsu (JP); Hideo Miyake, Tsu (JP); Masatoshi Hashimoto, Matsusaka (JP); Masaru Obata, Matsusaka (JP); Ryuji Uchida, Matsusaka (JP)

(73) Assignee: Hashimoto Electronic Industry Co., Ltd., Mie (JP)

( * ) Notice: Subject to any disclaimer, the term of this patent is extended or adjusted under 35 U.S.C. 154(b) by 267 days.

(21) Appl. No.: 12/908,093

(22) Filed: Oct. 20, 2010

(65) Prior Publication Data

US 2012/0097110 A1    Apr. 26, 2012

(51) Int. Cl.
*A01K 61/00* (2006.01)
(52) U.S. Cl. .................. 119/217; 119/218
(58) Field of Classification Search .......... 119/217, 119/200, 215, 216, 218, 224, 225
See application file for complete search history.

(56) References Cited

U.S. PATENT DOCUMENTS

| | | | |
|---|---|---|---|
| 4,221,187 A * | 9/1980 | Casey | 119/232 |
| 4,738,220 A * | 4/1988 | Ewald, Jr. | 119/202 |
| 4,798,168 A | 1/1989 | Vadseth et al. | |
| 5,293,838 A * | 3/1994 | Jorgensen et al. | 119/205 |
| 5,297,513 A * | 3/1994 | Musgrave | 119/252 |
| 5,791,290 A * | 8/1998 | Mueller | 119/218 |
| 6,443,097 B1 * | 9/2002 | Zohar et al. | 119/217 |
| 7,503,283 B2 * | 3/2009 | Abraham | 119/217 |
| 2011/0174230 A1 * | 7/2011 | Tamaru et al. | 119/218 |
| 2012/0097111 A1 * | 4/2012 | Tamaru et al. | 119/218 |

FOREIGN PATENT DOCUMENTS

| | | |
|---|---|---|
| GB | WO98/15627 | 4/1998 |
| JP | 2000-312542 | 11/2000 |
| JP | 2001-501482 | 2/2001 |
| JP | 2001-120110 | 5/2001 |
| JP | 2001-501482 | 6/2001 |
| JP | 2004-166553 | 6/2004 |
| JP | 2007-222132 | 9/2007 |
| JP | 2009-261338 | 11/2009 |

OTHER PUBLICATIONS

Yutaka Tamaru, "Research and Development of Combinatorial Bioengineering Using Zebrafish and Its Application on Drug Discovery", Yakugaku Zasshi, vol. 129 (11) The Pharmaceutical Society of Japan, pp. 1285-1293, (2009). [English Abstract].

Wenhui Wang, et al., "A Fully Automated Robotic System for Microinjection of Zebrafish Embryos", PLOS ONE, Sep. 2007: Issue 9: e862, pp. 1-7.

* cited by examiner

*Primary Examiner* — Yvonne Abbott
(74) *Attorney, Agent, or Firm* — Duane Morris LLP

(57) ABSTRACT

It is an object of the invention to provide a method for processing a very large number of fish eggs for gene injection and so on, which employs a simple system with high performance and a reasonable construction expense. It is another object to provide the method having an water tank apparatus capable of producing a large number of fish eggs continuously.

A large number of water tank groups having an independent drainage passage each is lighted up in turn with a predetermined interval. An egg-collecting case with a net bottom is set in the drainage passage connecting to the water tank group to which the lighting is started. The water tank group consists of a plurality of tank unit accommodating fishes each. Each book-shaped tank unit has a rectangular-shaped upper portion and a cone-shaped lower portion. Rotating water stream is formed in each tank unit.

11 Claims, 13 Drawing Sheets

METHOD FOR PROCESSING A LARGE NUMBER OF FISH EGGS

BACKGROUND OF THE INVENTION

1. Field of the Invention

The present invention relates to a method for processing a large number of fish eggs, in particular to an automated method for processing fertilized fish eggs. The invention can be employed for production method for producing genetically recombinant proteins and so on from fertilized fish eggs by gene injection. Furthermore, the invention can be employed to produce materials by means of using fertilized fish eggs.

2. Description of the Related Art

A method to produce specific protein is known by injecting gene material to the fertilized egg of the fish. This protein-producing method may have high productivity, because the specific fish such as the zebra fish lay eggs approximately every day.

The gene material must be injected into each fish eggs before dividing of the fertilized fish egg is started. However, a very large number of the fish eggs employed for the gene-injection is very small. For example, the eggs of the zebra fish have a diameter of about 1 mm. It is not easy to deal very large number of small fish eggs within a short time. Moreover, the injection apparatus for injecting the gene material into the small fish egg is expensive, because precision control is required for an injection needle to inject the gene material into the very small fish egg.

It is known that zebra fish lays eggs by means of lighting. Japan Unexamined Patent Publication No. 2001-120,110 proposes a rectangular-shaped water tank having square-shape in the horizontal direction. Water supplied to an upper portion of the water tank is drained out from a drainage pipe established in the bottom of the water tank. A square-shaped upper half portion of the water tank consists of four pieces of perpendicular wall plates. A reverse-pyramid-shaped lower half portion of the water tank consists of four pieces of slope wall plates. Each slope wall is slanted diagonally.

However, it is considered that the fish eggs is caught easily at corners between two slope wall plates of the reverse-pyramid-shaped lower half portion of the water tank. It is difficult to separate the caught fish eggs from the corners, because a fish-separating net is disposed between the upper portion and the lower portion of the water tank. The fish eggs staying for a long time at the corners deteriorate the quality of the water.

Japan Patent No. 3,769,680 illustrates a water tank having a cylinder-shaped upper portion and a cone-shaped lower portion. A pair of water-supplying pipes is disposed horizontally at the cylinder-shaped portion. A pair of drainage pipes is disposed at the cylinder-shaped upper portion. These pipes makes rotating water stream in the water tank. The rotating water stream rises upwardly.

U.S. Pat. No. 4,798,168 illustrates a water tank having a cylinder-shaped upper portion and a cone-shaped lower portion. A pair of water-supplying pipes is disposed horizontally at the cylinder-shaped upper portion of a water tank. A drainage pipe is connected to a bottom hole disposed at a top of the cone-shaped lower portion of the water tank. These pipes makes rotating water stream in the water tank. The rotating water stream descends downwardly. However, these water tanks described in the patent documents 2-3 needs a large horizontal space.

SUMMARY OF THE INVENTION

It is an object of the invention to provide a method with high performance, which processes a large number of fish eggs. It is another object of the invention to provide a method for producing genetically recombinant proteins and so on from a very large number of fertilized fish eggs with a simple system having a reasonable construction expense.

It is another object to provide the producing method employing a water tank apparatus capable of producing a large number of fish eggs continuously. It is another object to provide the producing method employing a water tank apparatus capable of removing the fish eggs from inner side walls of the tank unit easily.

According to an aspect of the present invention, the method comprises an egg-producing step, an egg-collecting step, an egg-arranging step and an injecting step, which are executed in turn. Especially, the drainage including the produced fish eggs is drained out from a water tank apparatus.

The fish eggs in the drainage are collected on a porous plate of an egg-collecting case through which the drainage flows. The egg-collecting case is transferred from an egg-collecting apparatus to an egg-arranging apparatus after collecting the fish eggs from the drainage of the water tank apparatus. Accordingly, the water tank apparatus does not need a valve changing a drainage passage from a water-purifying apparatus to an egg-collecting apparatus. As the result, cleaning of the valve is abbreviated.

According to a preferred embodiment, each illumination period of water tank groups is started from each starting time points being different to each other.

According to a preferred embodiment, one half of the water tank groups are illuminated, and the other half of the water tank groups is not illuminated. Combination of the illuminated water tank groups is changed in turn.

Preferably, each illumination period of each water tank group is fourteen hours, and each non-illumination period of each water tank group is ten hours. The egg-collecting case is set in drainage passages of the water tank groups during a predetermined egg-collecting period stated from a time point when the water tank group is lighted up. As the result, the drainages from the other water tank groups except only one water tank group to which the lighting is started can be drained to the water-purifying apparatus. Moreover, a number of the fish eggs produced for a constant period approaches mostly constant. As the result, a gene-injection apparatus can inject gene material into a large number of the fish eggs a day.

In a preferable case, the injection must be done within less than twenty minutes, more preferably ten minutes. For example, a new water tank group is lighted up ten minutes later after starting of lighting of the previous water tank group. It means that the water tank apparatus preferably has one hundred and forty-four water tank groups. A construction expense and an operating cost of the expensive injection apparatus can be decreased.

According to one preferred embodiment, each of the water tank groups is surrounded by light-shielding members respectively. As the result, the water tank groups can be disposed nearly to each other.

According to another preferred embodiment, each drainage of the water tank groups flows out through each egg-collecting case collecting the fish eggs from each of drainages. As the result, the fish eggs can be collected easily.

According to another preferred embodiment, the drainage drained out from a bottom hole of each tank unit returns back to the tank units through a water purifying apparatus. In the other words, the tank unit does not have a water valve changing a water flow passage in order to collect the fish eggs. The fish eggs in the drainage are collected by the egg-collecting case disposed in a drainage passage.

According to another preferred embodiment, the egg-collecting case is set in a drainage passage of the lighted up water tank group during a predetermined egg-collecting period. The egg-collecting case is separated from the drainage passage after the egg-collecting period. As the result, Feces in the drainage are not collected by the egg-collecting case.

According to another preferred embodiment, a predetermined number of the tank units are arranged to one line in a horizontal direction on each shelf of a book-shelf-shaped frame. Each of the tank units has book-shape with a predetermined thickness. As the result, the water tank apparatus can have a high packing density of the tank units.

According to another preferred embodiment, the book-shaped tank unit has a rectangular-shaped upper portion and a cone-shaped lower portion. Moreover, the cone-shaped lower portion of the tank unit has a top portion having a bottom hole connected to a drainage conduit for draining the drainage.

The fish eggs circulate along the cone-shaped wall of the cone-shaped lower portion of the tank unit, because a specific gravity of the fish egg is larger than the water. As the result, the fish eggs are not caught by an inner surface of the cone-shaped lower portion of the tank unit, because cone-shaped lower portion does not have a corner. Moreover, a rotation angular velocity of the rotating water stream increases near the bottom hole, because a radius of the cone-shaped lower portion decreases near the bottom hole.

Furthermore, the tank unit has a large cavity for the fishes, because the upper portion of the tank, unit has rectangular-shape. Moreover, the book-shaped tank units can be arranged with a high value of the packing density.

According to another preferred embodiment, wherein the book-shaped tank unit has a water-supplying nozzle forming water stream rotating horizontally in the book-shaped tank unit. The water-supplying nozzle is disposed at a boundary portion between the rectangular-shaped upper portion and the cone-shaped lower portion. The water-supplying nozzle spouts out with water downwardly in order to force the rotating water stream downwardly. Accordingly, the water stream with a high speed rotates along an inner surface of the cone-shaped lower portion. The fish eggs remove the inner surface of the cone-shaped lower portion effectively.

According to another preferred embodiment, the water-supplying nozzle is disposed at a corner between adjacent two side walls of the rectangular-shaped upper portion. Preferably, the rectangular-box-shaped upper portion consists of a pair of wide plates and a pair of narrow plates. The water-supplying nozzle is disposed at a corner between one wide plate and one narrow plate being adjacent to each other. Moreover, the water-supplying nozzle spouts out with the water stream toward a center portion of the wide plate in the horizontal cross-section of the rectangular-box-shaped upper portion. As the result, the water stream is rotated effectively.

According to another preferred embodiment, the tank unit has a separating net disposed at a boundary portion between the rectangular-shaped upper portion and the cone-shaped lower portion in order to separate the fish eggs from fishes. As the result, the separating net for keeping the fishes in the upper portion of the tank unit is hold easily.

According to another aspect of the present invention, the method comprises an egg-producing step, an egg-collecting step, an egg-arranging step and an injecting step, which are executed in turn. Especially, the drainage including the produced fish eggs is drained out from a water tank apparatus.

Water in a tank unit of the water tank apparatus is rotated horizontally. The tank unit has a rectangular-box-shaped upper portion and a cone-shaped lower portion. Furthermore, the water in the tank unit is drained from a bottom hole disposed at a top of the cone-shaped lower portion of the tank unit.

The inventor found that fish egg in the rotating water stream in the tank unit never adhere on an inner surface of the cone-shaped lower portion of the tank unit. The reason is explained later.

DETAILED DESCRIPTION OF THE PREFERRED EMBODIMENT (Explanation of the Production Method)

Figure 1:
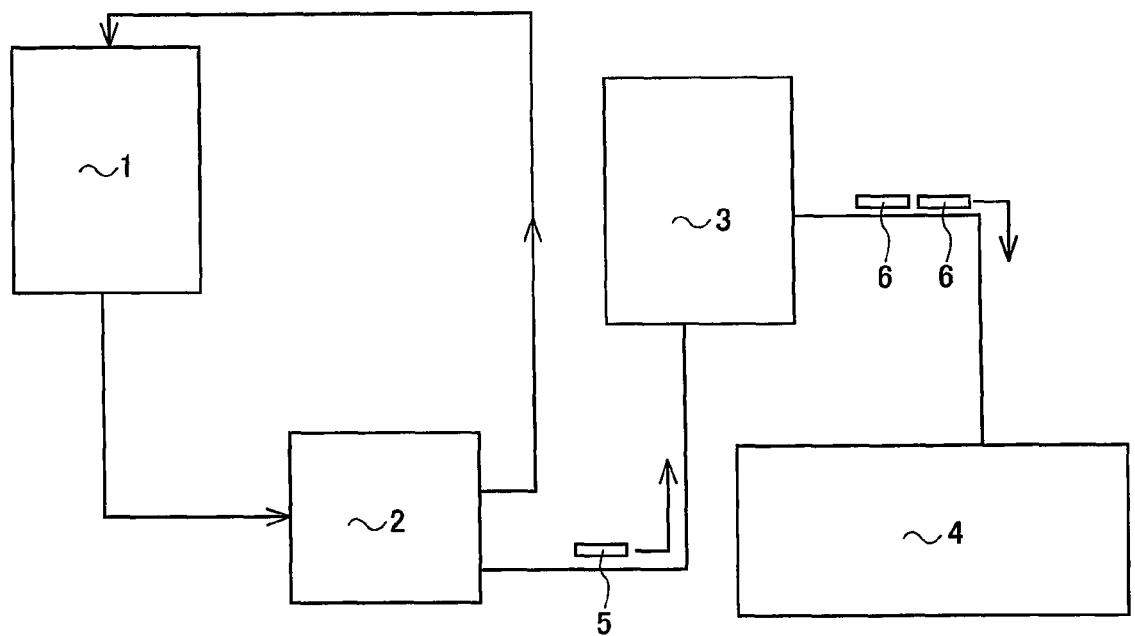
FIG. 1 is a schematic diagram of a protein-producing system.
Figure 2:
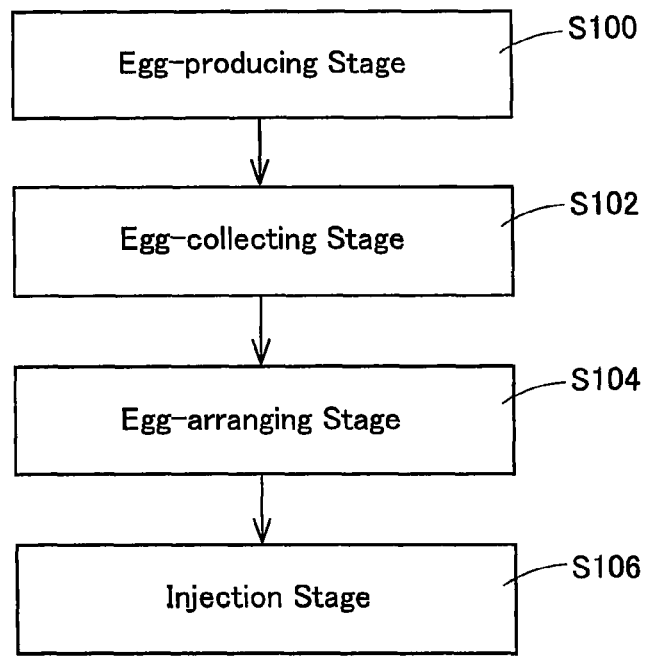
FIG. 2 is a flow diagram of a protein-producing process.

A production method for producing genetically recombinant proteins from fertilized fish eggs is explained referring to FIGS. 1 and 2. FIG. 1 shows a schematic diagram of a protein-producing system. FIG. 2 shows a flow diagram of a protein-producing process.

The protein-producing apparatus has an egg-producing apparatus 1, an egg-collecting apparatus 2, an egg-arranging apparatus 3 and an injection apparatus 4. The egg-producing apparatus 1 executing an egg-producing stage S100 has a water tank apparatus for breeding a predetermined number of pairs of zebra fishes.

The egg-collecting apparatus 2 executing an egg-collecting stage S102 collects fish eggs from drainage of the water tank apparatus. The drainage returns to the water tank apparatus. The egg-arranging apparatus 3 executing an egg-arranging stage S104 arranges the collected fish eggs. The injection apparatus 4 executing a gene-injecting stage S106 injects gene material into the fish eggs each.

Water of the water tank apparatus is drained to the egg-collecting apparatus 2. The fish eggs are collected by an egg-collecting case 5 in the egg-collecting apparatus 2. The egg-collecting case 5 is transferred from the egg-collecting apparatus 2 to the egg-arranging apparatus 3. The fish eggs are arranged on an egg-arranging case 6 in the egg-arranging apparatus 3. The egg-arranging case 6 is transferred from the egg-arranging apparatus 3 to a gene-injecting apparatus 4 after arranging the fish eggs.

(Explanation of Egg-Producing Apparatus 1)

Figure 3:
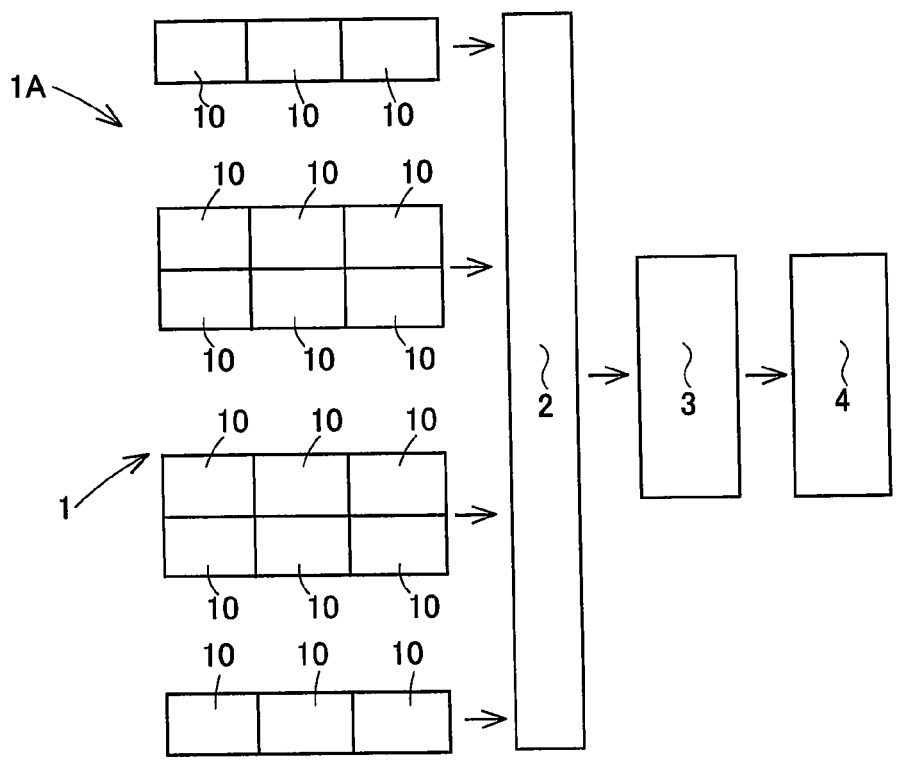
FIG. 3 is a schematic plan view of the protein-producing system shown in FIG. 1.
Figure 4:
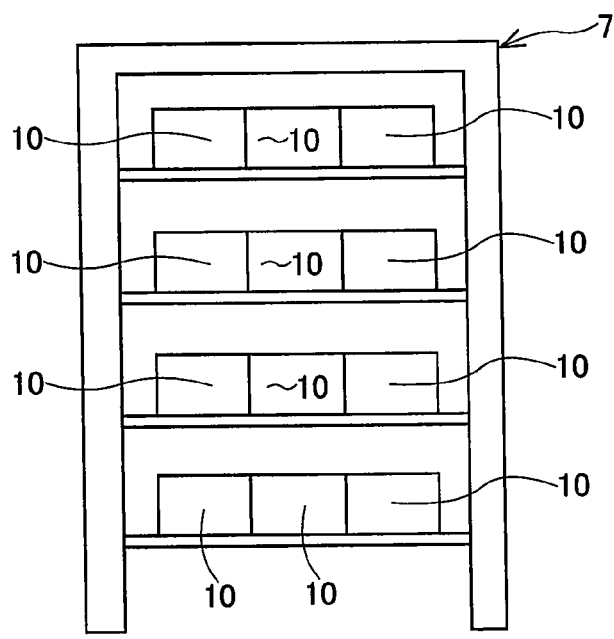
FIG. 4 is a front view of one bookshelf-shaped frame.

The egg-producing apparatus 1 is explained referring to FIGS. 3 and 4. FIG. 3 is a schematic plan view of the protein-producing system shown in FIG. 1. The egg-producing apparatus 1 has a water tank apparatus 1A, a water-circulating apparatus 1B and a lighting apparatus 1C.

However, the water-circulating apparatus 1B and the lighting apparatus 1C are not illustrated in FIG. 3. Water tank apparatus 1A has seventy-two water tank groups 10 arranged horizontally and vertically. The egg-collecting apparatus 2 collects the fish eggs accommodated in the drainage drained from the water tank apparatus 1A.

The drainage in which the fish eggs are removed is returned to the water tank groups 10 after purifying the drainage. The collected fish eggs in the egg-collecting apparatus 2 are transferred to the egg-arranging apparatus 3. The arranged fish eggs in the egg-arranging apparatus 3 are transferred to the injection apparatus 4.

Water tank apparatus 1A has six bookshelf-shaped frames 7. Each of the bookshelf-shaped frames 7 accommodates twelve water tank groups 10 arranged horizontally and vertically. FIG. 4 is a front view of one bookshelf-shaped frame 7.

(Explanation of the Water Tank Apparatus 1A)

Figure 5:
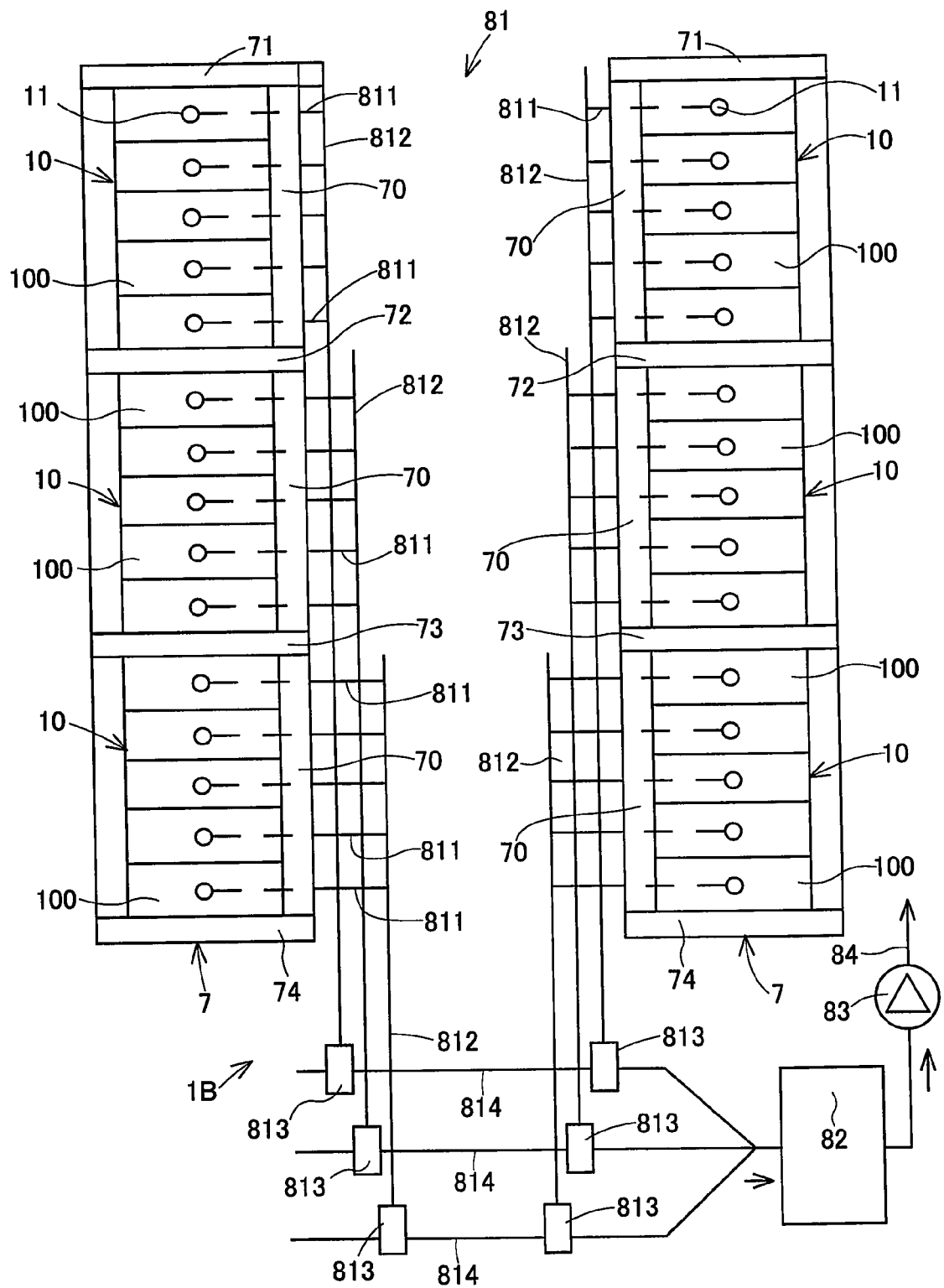
FIG. 5 is a schematic plan view of two water tank groups accommodated in two bookshelf-shaped frames.
Figure 6:
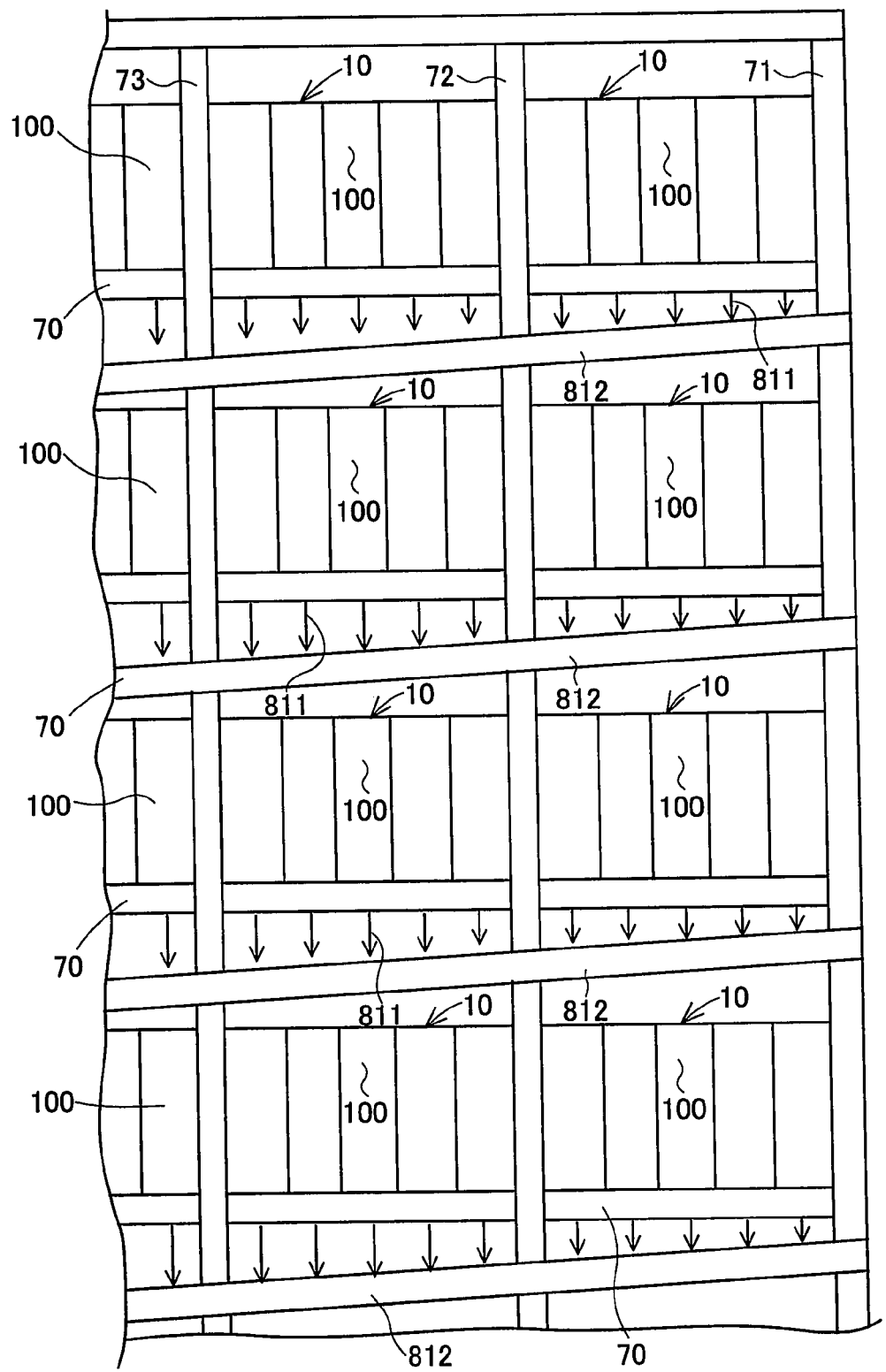
FIG. 6 shows a schematic front view of a part of one bookshelf-shaped frame.

The water tank apparatus 1A shown in FIG. 3 is explained referring to FIGS. 5 and 6. FIG. 5 is a schematic plan view of two water tank groups 10 accommodated in two bookshelf-shaped frames 7. FIG. 6 shows a schematic front view of a part of one bookshelf-shaped frame 7.

Seventy two of water tank groups 10 consist of five tank units 100 each. Three water tank groups 10 are arranged horizontally to one line on one shelf board 70 of the frame 7. Each of the frames 7 has four steps of the shelf boards 70. Accordingly, each of the frames 7 accommodates twelve water tank groups 10 consisting of five tank units 100 each. As the result, water tank apparatus 1A has three hundred sixty tank units 100. Each frame 7 has vertical wall plates 71-74 supporting shelf boards 70. The vertical wall plates 71-74 are extending vertically between adjacent two water tank groups 10.

(Explanation of the Water-Circulating Apparatus 1B)

Figure 7:
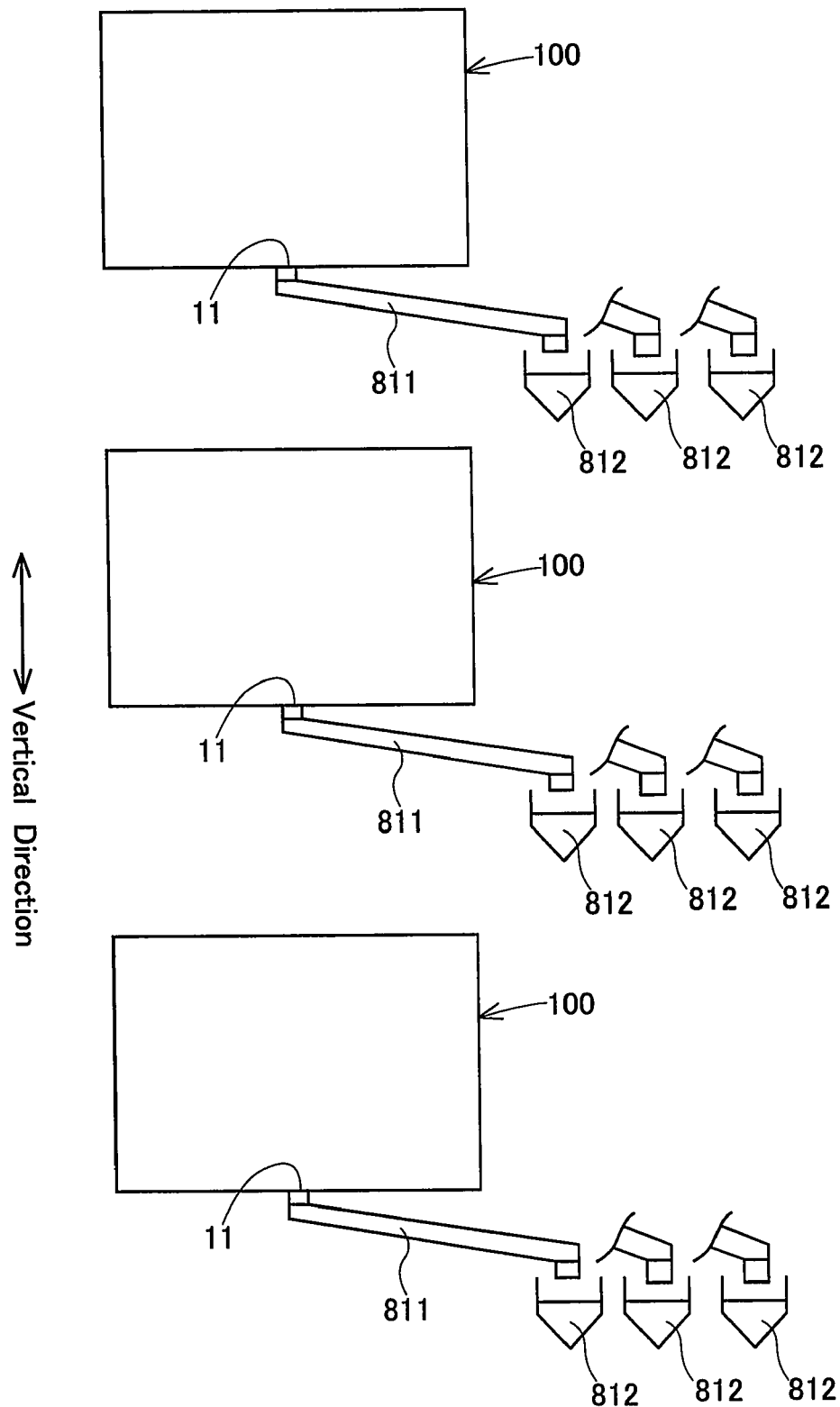
FIG. 7 is a schematic side view of a part of one bookshelf-shaped frame.

Water-circulating apparatus 1B is explained referring to FIGS. 5-7. FIG. 7 is a schematic side view of a part of one bookshelf-shaped frame 7. Water-circulating apparatus 1B has a drainage passage 81, a water-purifying apparatus 82, a water pump 83, a water-supplying pipe 84 and nozzles 85. However, FIG. 5 does not illustrate the nozzles 85 for supplying purified water to each tank unit 100.

Each drainage of tank units 100 flows to the water purifying apparatus 82 via the drainage passage 81. The water pump 83 sends the purified water from the water purifying apparatus 82 to nozzles 85. Each tank unit 100 has a pair of nozzles 85.

(Explanation of the Drainage Passage 81)

Drainage passage 81 has drainage pipes 811, upper gutters 812, egg-collecting portions 813 and lower gutters 814. Each tank unit 100 has a bottom hole 11 connected to each drainage pipe 811 each. An outlet of the drainage pipe 811 reaches an upper position of the upper gutters 812. An outlet of upper gutters 812 reaches the egg-collecting portion 813.

The lower gutters 84 are extended under the egg-collecting portions 83. An outlet of the lower gutters 84 reaches at an upper portion of an inlet aperture of the water-purifying apparatus 82. Three upper gutters 812 are extending to one direction in parallel along each bookshelf-shaped frame 7. The drainage in five drainage pipes 811 of one water tank group 10 reaches to water-purifying apparatus 82 via one of three upper gutters 812, one of three egg-collecting portions 813 and one of three lower gutters 814. Each gutter 812 and 813 are slanted.

(Explanation of the Egg-Collecting Portions 813)

Figure 8:
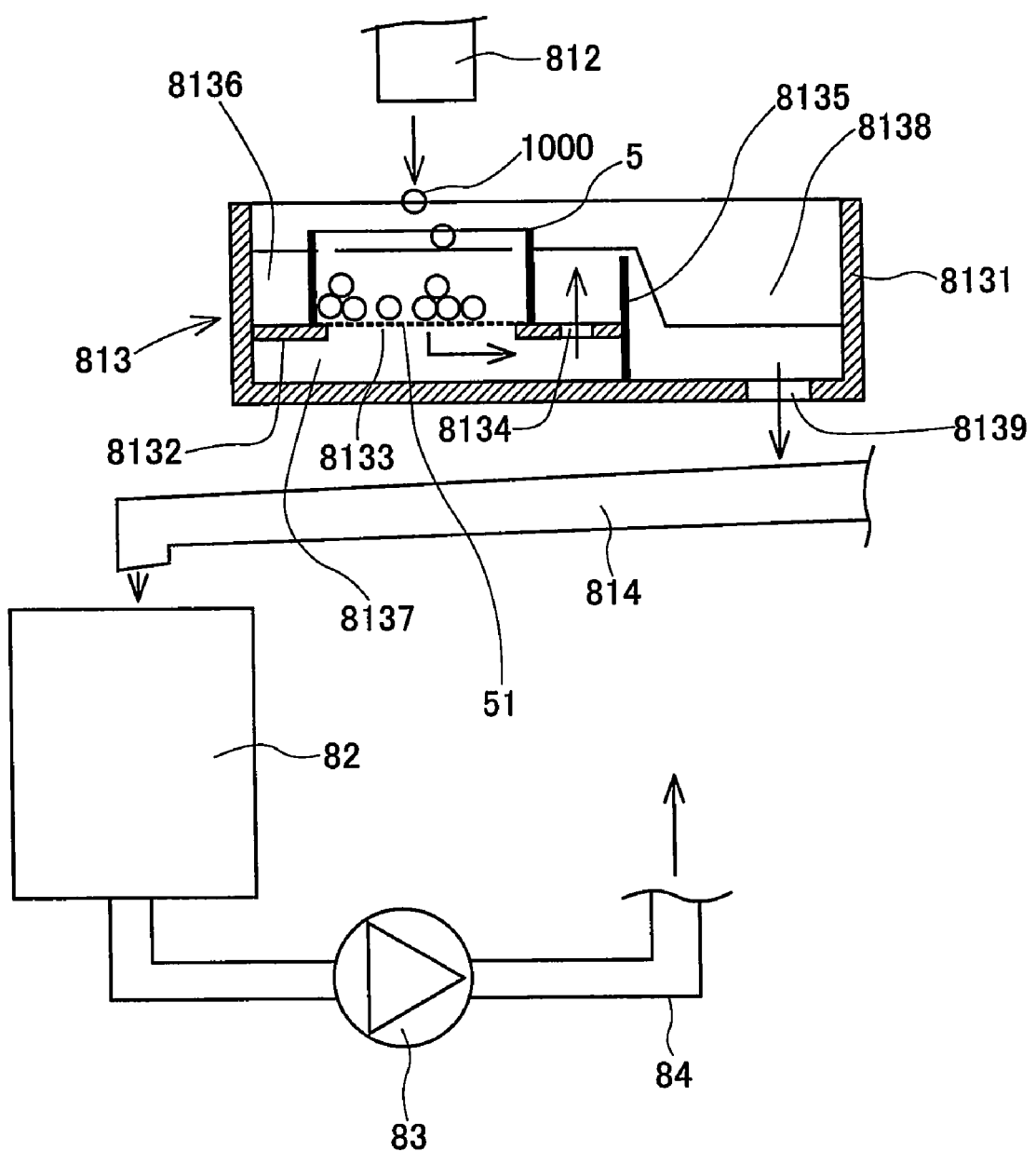
FIG. 8 is a schematic cross-section showing one egg-collecting portion.

FIG. 8 is a schematic cross-section showing one egg-collecting portion 813. The egg-collecting portion 813 has a rectangular box 8131 having a shallow bottom and an upper opening. An intermediate plate 8132 extending horizontally is posted in an upper portion of the shallow bottom. The intermediate plate 8132 has holes 8133 and 8134. An intermediate 8135 extending vertically is posted from the shallow bottom.

The intermediate plate 8135 comes into contact with an edge of the intermediate plate 8132. Three chambers 8136, 8137 and 8138 are formed in the rectangular box 8131 by the intermediate plates 8132 and 8135. The inlet chamber 8136 is formed in the upper space of the intermediate plate 8132.

The middle chamber 8137 is formed in the lower space of the plate 8132. The intermediate plate 8135 stands between the outlet chamber 8138 and the chambers 8136 and 8137. The hole 8133 connects chambers 8136 and 8137. The hole 8134 connects chambers 8137 and 8138. The drainage in chamber 8138 is drained downwardly through a hole of the bottom plate of rectangular box 8131.

The egg-collecting case 5 having a bottom net 51 and an upper opening are set on the intermediate plate 8132. Accordingly, the drainage in the chamber 8136 flows down into the chamber 8137. The drainage flows down from the outlet of the upper gutter 812 into the egg-collecting case 5. The fish egg 100 in the drainage is collected on the bottom net 51. The drainage overflows into the chamber 8138 through the chamber 8137. The drainage is always drained into water-purifying apparatus 82 via the lower gutter 814. Egg-collecting case 5 is transferred to egg-arranging apparatus 3 manually or automatically.

(Explanation of the Lighting Apparatus 1C)

Figure 9:
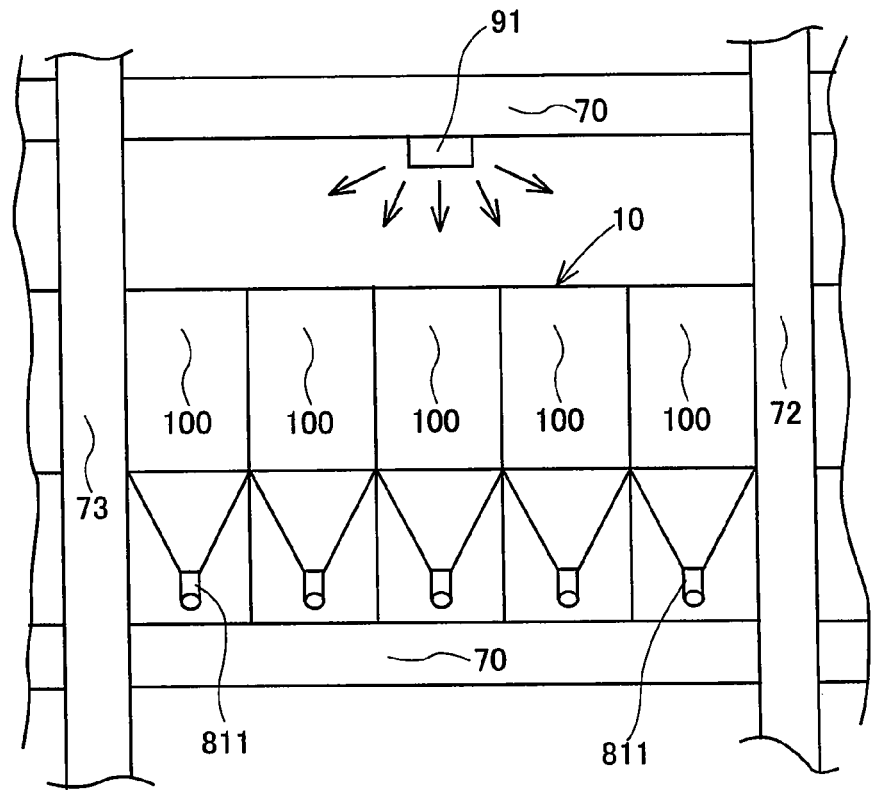
FIG. 9 is a schematic front view of the water tank group.
Figure 10:
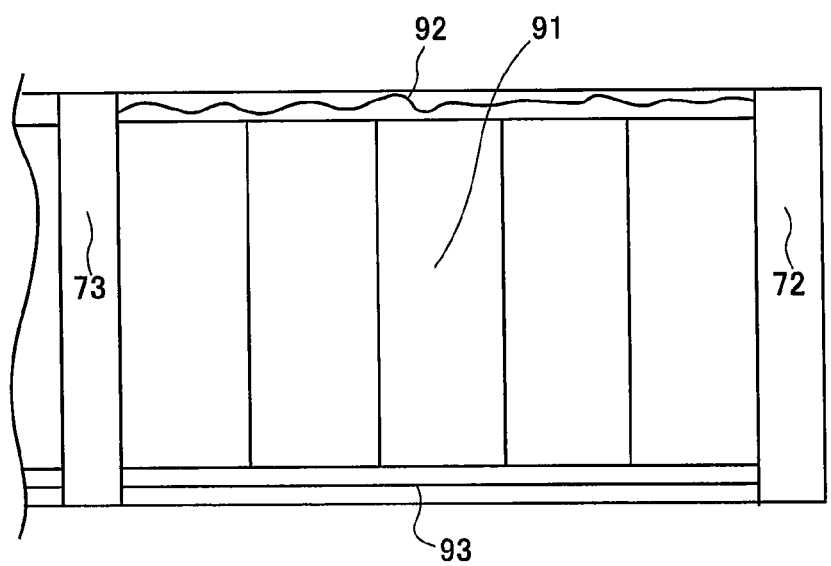
FIG. 10 is a schematic plan view of the water tank group.
Figure 11:
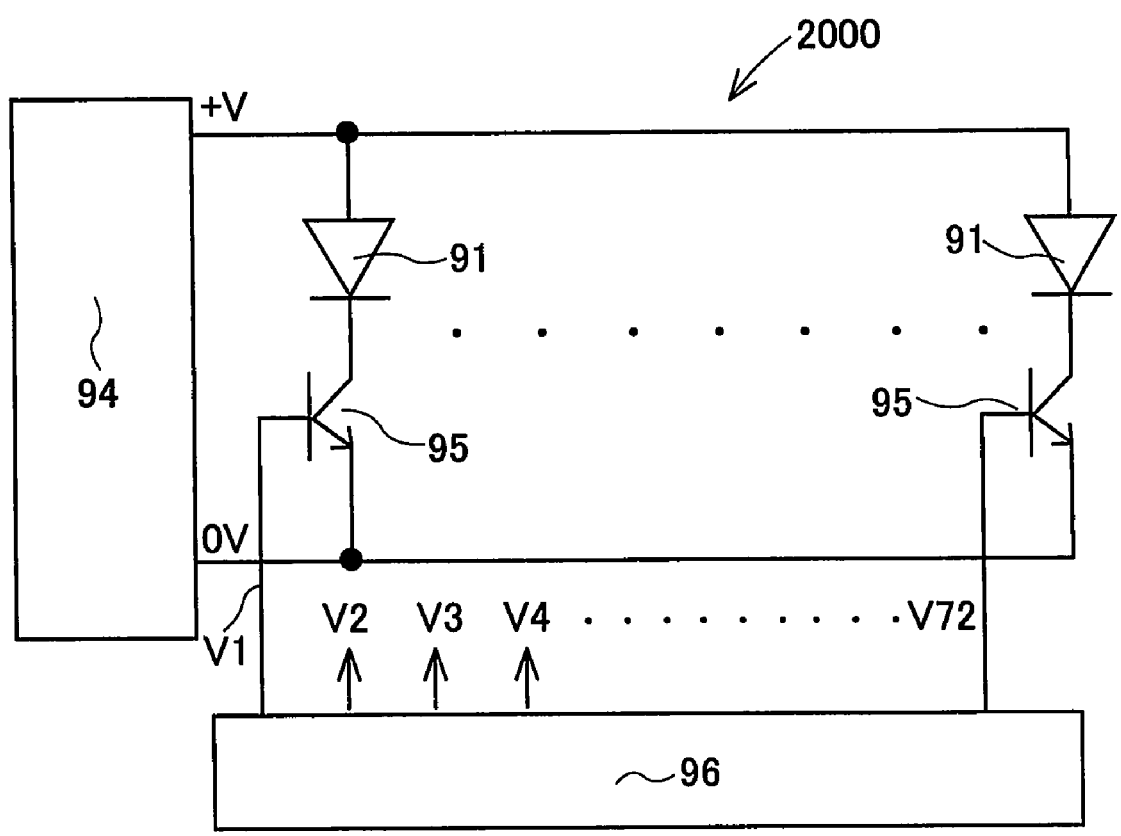
FIG. 11 is a block diagram showing a light control circuit topology.
Figure 12:
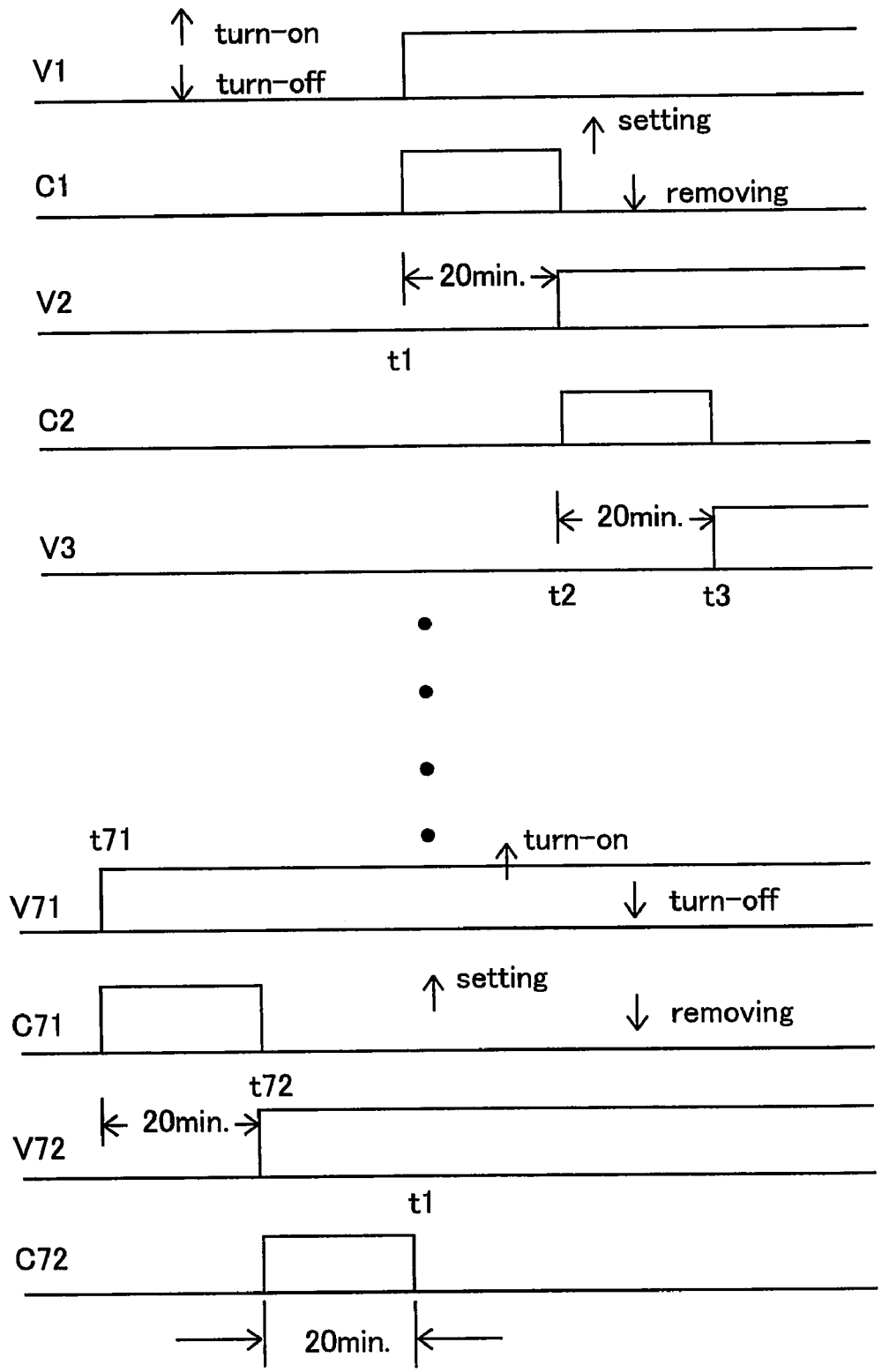
FIG. 12 is a timing chart of the light control circuit shown in FIG. 11.

The lighting apparatus 1C is explained referring to FIGS. 9-12. FIG. 9 is a schematic front view of the water tank group 10. FIG. 10 is a schematic plan view of the water tank group 10. FIG. 11 is a block diagram showing a light control circuit topology. FIG. 12 is a timing chart of the light control circuit 2000 shown in FIG. 11. FIG. 12 is a timing chart showing case-setting periods for setting the egg-collecting case in each drainage passage in turn, too.

A LED lamp 91 is fixed to a down surface of shelf boards 70. Water tank group 10 is surrounded with shelf boards 70 and vertical wall plates 72 and 73. Furthermore, a front surface of the water tank group 10 is shielded with a black curtain 92. A back surface of the water tank group 10 is shielded with a black plate 93.

The frame 7 is painted with black color paint. As the result, each water tank group 10 is accommodated in each independent dark room by means of closing the curtain 92. Each water tank group 10 is illuminated by each LED 91. The lighting apparatus 1C has LEDs 91, transistors 95, a DC power supply 94 and a controller 96. The DC power source 94 applies a predetermined DC voltage to LEDs 91.

Each LED 91 is connected to each transistor 95 in series. The controller 96 controls the transistors 95. By controlling the LEDs 91, each of water tank groups 10 is lighted in turn. The first water tank group 10 is lighted up during fourteen hours from a time point t1 and in the darkness during ten hours after the lighting. The second water tank group 10 is lighted up during fourteen hours from a time point t2 and in the darkness during ten hours after the lighting. The third water tank group 10 is lighted up during fourteen hours from a time point t3 and in the darkness during ten hours after the lighting. Similarly, the 71st water tank group 10 is lighted up during fourteen hours from a time point t71 and in the darkness during ten hours after the lighting. The 72nd water tank group 10 is lighted up during fourteen hours from a time point t72 and in the darkness during ten hours after the lighting.

A time difference between adjacent two lighting-up timing points is twenty minutes. The egg-collecting case 5 shown in FIG. 8 is set in a predetermined drainage passage connected each tank unit 100 during twenty minutes from the starting of the lighting-up. Four egg-collecting periods C1, C2, C71 and C72 are shown in FIG. 12. As the result, egg-collecting apparatus 2, egg-arranging apparatus 3 and injection apparatus 4 are always operated.

(Explanation of Tank Unit 100)

Figure 13:
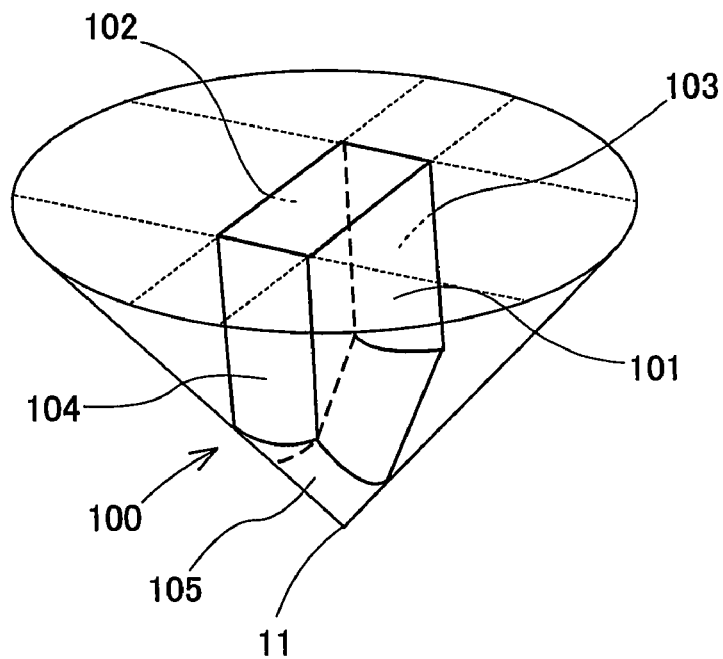
FIG. 13 is a schematic perspective view showing an outer surface of tank unit.
Figure 14:
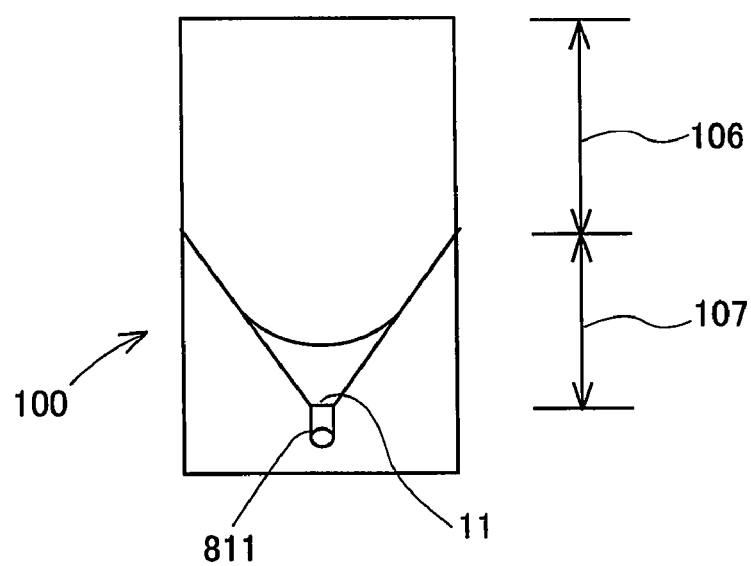
FIG. 14 is a schematic side view of tank unit.
Figure 15:
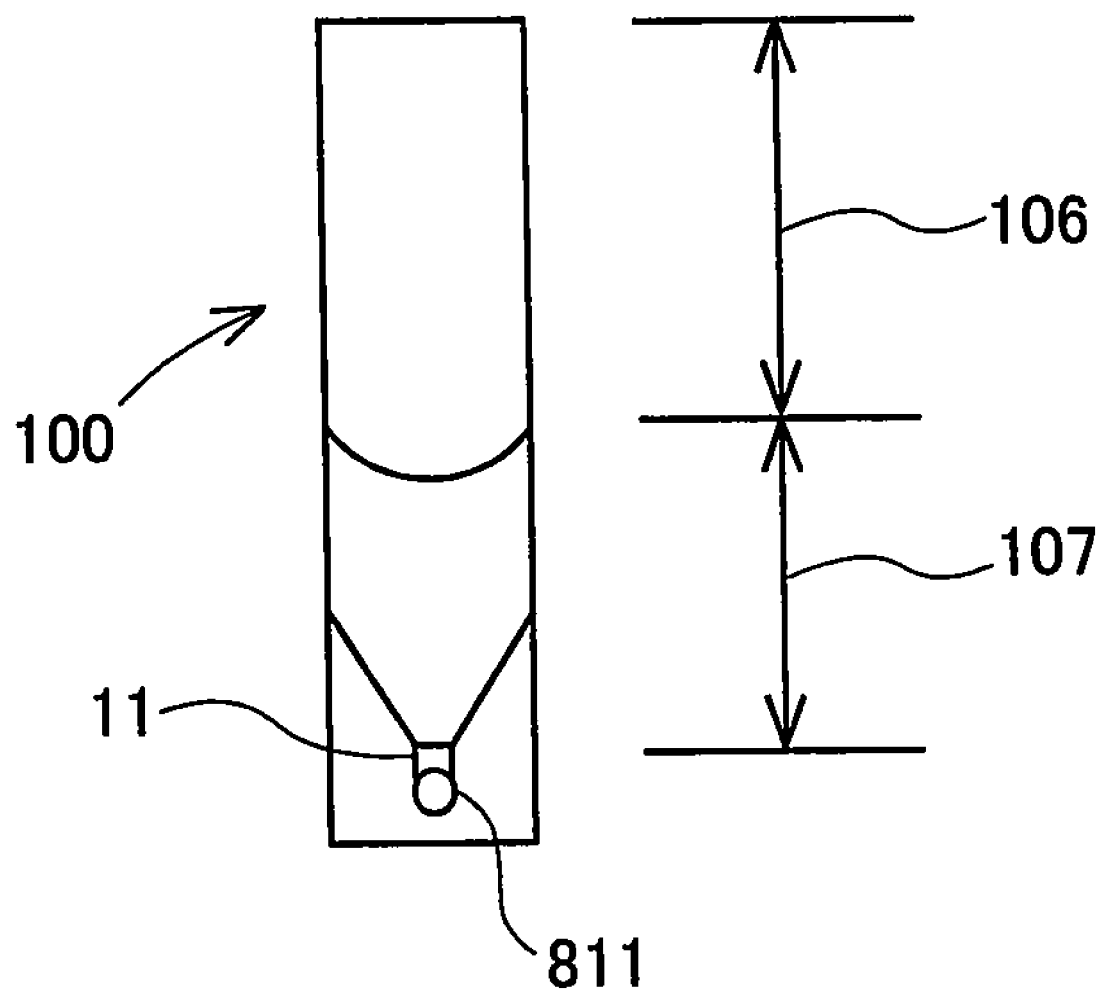
FIG. 15 is a schematic front view of tank unit.

The tank unit 100 is explained referring to FIG. 13-19. FIG. 13 is a schematic perspective view showing an outer surface of tank unit 100. FIG. 14 is a schematic front view of tank unit 100. FIG. 15 is a schematic side view of tank unit 100.

Tank unit 100 has four flat walls 101-104 and one cone-shaped bottom plate 105. The four flat walls 101-104 forms a rectangular-shaped upper portion 106. The cone-shaped bottom plate 105 forms a cone-shaped lower portion 107. The cone-shaped lower portion 107 has a top portion having a bottom hole 11 connected to the drainage pipe 811.

However, two of flat walls 101 and 102 are wider than two of flat walls 103 and 104. Accordingly, the cone-shaped lower portion 107 includes a pair of lower portions of two wide flat walls 101 and 102. In the other words, the cone-shaped lower portion 107 includes two of flat wall portions.

Figure 16:
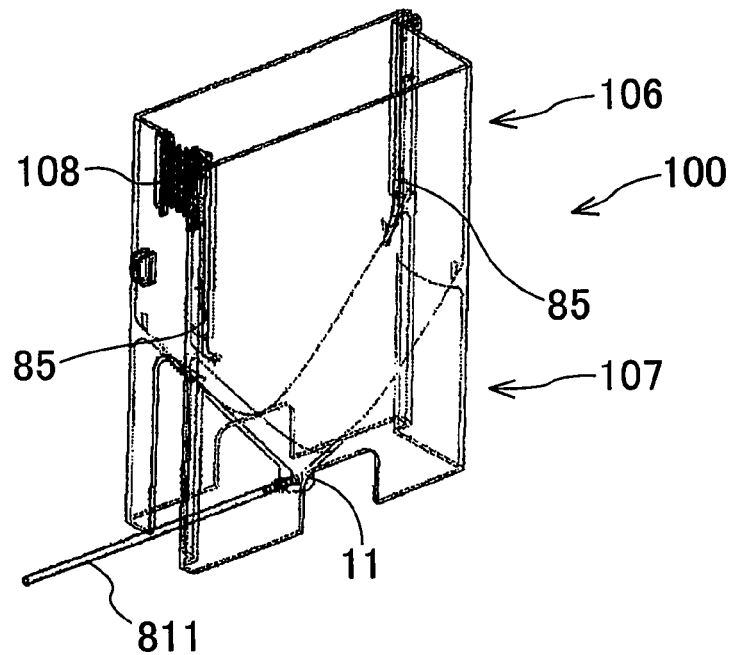
FIG. 16 is a perspective view of a designed tank unit.
Figure 17:
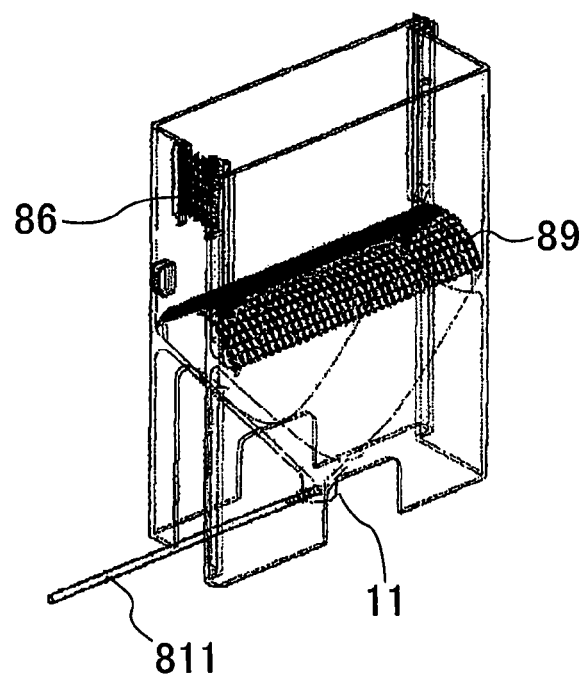
FIG. 17 is a perspective view of a designed tank unit with a separating net.

FIG. 16 is a perspective view of a designed tank unit 100. FIG. 17 is a perspective view of a designed tank unit 100 with a separating net 89. Fish eggs pass through the separating net 89, but zebra fishes can not pass through the separating net 89.

Moreover, the wall 104 has an overflow window 108 for over-flowing water. In FIG. 16, two nozzles 85 are set at two of a boundary portion between the rectangular-shaped upper portion 106 and the cone-shaped lower portion 107. Each of two nozzles 85 is set at each of two corners between one of two wide flat walls 101 and 102 and one of two narrow flat walls 103 and 104.

Figure 18:
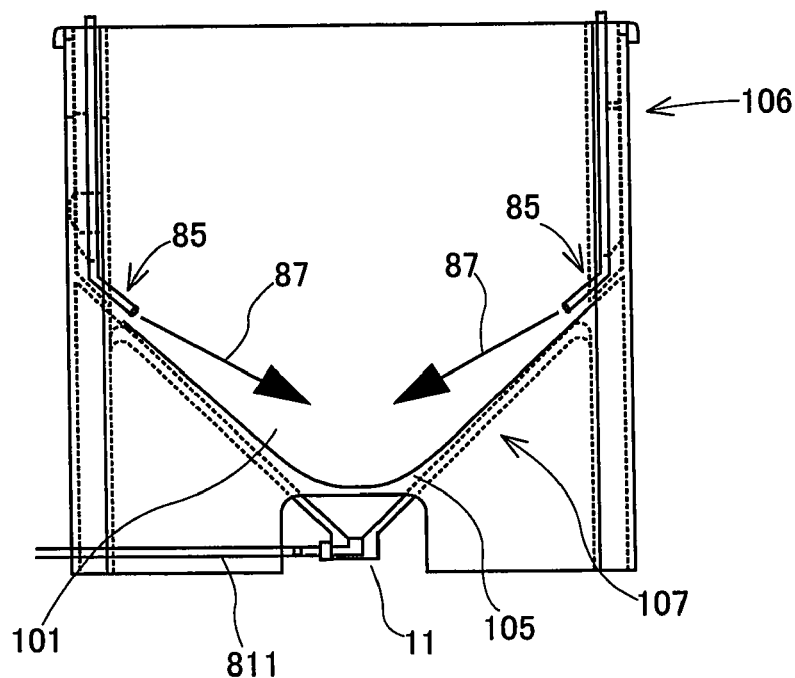
FIG. 18 is a side view of a designed tank unit.

FIG. 18 is a side view of designed tank unit 100. Two of nozzles 85 spout water stream 87 each. The water stream 87 is mostly flows along an inner surface of the cone-shaped bottom plate 105. As the result, the fish eggs remove the inner surface of the cone-shaped bottom plate 105. An angle between the water stream 87 and the inner surface of the cone-shaped bottom plate 105 is in a range of 10-30 degree.

Figure 19:
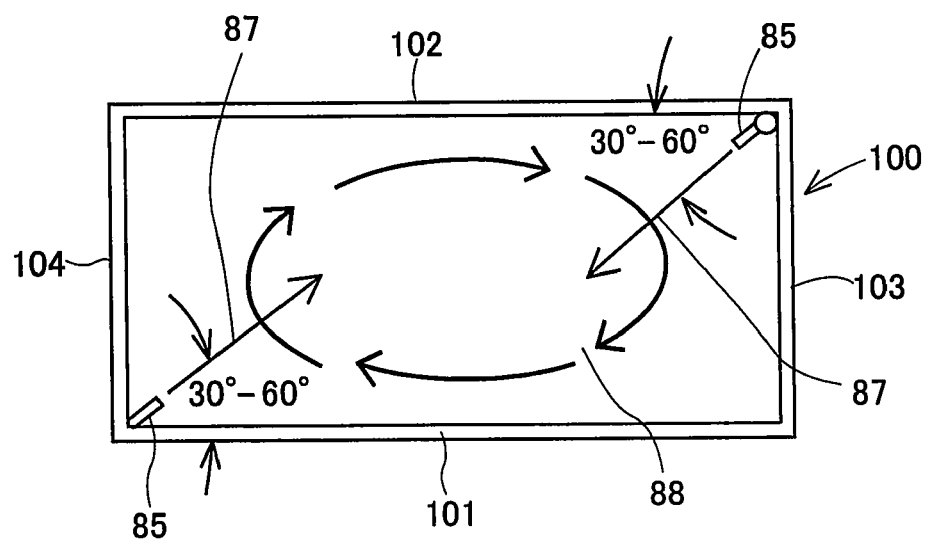
FIG. 19 is a plan view of designed tank unit.

FIG. 19 is a plan view of designed tank unit 100. Two of nozzles 85 spout water stream 87 each. An angle between the water stream 87 and one of flat walls 101-102 is in a range of 30-60 degree. As the result, rotating water stream is produced in the cone-shaped lower portion 107.

cone-shaped lower portion In the above embodiment, the injection of gene-material is explained. However, any materials can be injected in fish eggs instead of the gene materials.

It is explained one reason that an fish egg in rotating water is not adhere on the inner surface of the tank unit. The fish eggs have a little larger specific gravity than water. Accordingly, the rotating fish eggs moves near an inner surface of the cone-shaped lower portion. However, a rotating speed of a boundary layer of water rotating very near the inner surface of the cone-shaped lower portion has a low speed by friction. Consequently, the fish egg near the inner surface of the cone-shaped lower portion is forced toward the center portion in the radial direction with the Magnus effect. In the other words, a lifting force toward the center portion in the radial direction forces the fish eggs.

Another reason is explained. The fish egg has a diameter of about 1 mm. Accordingly, two parts of the rotating water stream coming into contact with two portions of the outer surface of fish egg have different speeds to each other. The one part of the water stream has a lower speed than the other part of the water stream. In the other words, the inner part of the water stream has a lower speed than the outer part of the water stream, when the water stream rotating horizontally. Accordingly, the fish egg rotates strongly in accordance with a difference of the speed difference between the two parts of the water stream, which come into contact with two portions of the fish egg respectively. Consequently, the rotating fish egg rotates along the inner surface of the cone-shaped lower portion can not stick on the inner surface.

What is claimed is:

1. A method for processing a large number of fish eggs, comprising the steps of:
    an egg-producing step for producing fish eggs by lighting up a water tank apparatus accommodating fishes;
    an egg-collecting step for collecting the fish eggs from drainage drained out from the water tank apparatus;
    an egg-arranging step for arranging the collected fish eggs at a predetermined positions capable of injecting gene material into the fish eggs; and
    an injecting step for injecting materials into the arranged fish eggs in turn;
    wherein the fish eggs in the drainage are collected on a net of an egg-collecting case through which the drainage flows; and
    the egg-collecting case is transferred from an egg-collecting apparatus to an egg-arranging apparatus after collecting the fish eggs from the drainage of the water tank apparatus.

2. The method according to claim 1, wherein the egg-producing step has a tank-lighting step for lighting the water tank apparatus during a predetermined illumination period after a predetermined non-illumination period;
    the water tank apparatus includes more than six water tank groups including a plurality of tank units accommodating a plurality of fishes each;
    each of the water tank groups is independently lighted up during the illumination period started at each starting time point being different to each other; and
    the egg-collecting case is set in drainage passages of the water tank groups during a predetermined egg-collecting period stated from a time point when the water tank group is lighted up.

3. The method according to claim 2, wherein each of water tank groups is surrounded by light-shielding-members respectively.

4. The method according to claim 2, wherein the drainage flowing out from the water tank groups returns to the water tank groups through a water-purifier after flowing through each egg-collecting case collecting the fish eggs from each drainage flowing out from each water tank groups in the egg-collecting step.

5. The method according to claim 4, wherein water is always supplied to each tank unit;
    water is always drained out from a bottom hole of each tank unit;
    water is always circulated through each tank unit; and
    the egg-collecting case disposed in a drainage passage has a net capable of collecting the fish eggs from the drainage flowing through the net.

6. The method according to claim 5, wherein the egg-collecting case is set in the drain passage of the illuminated water tank group during the egg-collecting period, and the egg-collecting case is separated from the drain passage after the egg-collecting period.

7. The method according to claim 2, wherein a predetermined number of the tank units having book-shape are arranged to one line in a horizontal direction on each shelf of a bookshelf-shaped frame.

8. The method according to claim 7, wherein the book-shaped tank unit has a rectangular-shaped upper portion and a cone-shaped lower portion; and the cone-shaped lower portion of the tank unit has a top portion having a bottom hole connected to a drainage conduit for draining the drainage.

9. The method according to claim 8, wherein the book-shaped tank unit has a water-supplying nozzle forming water stream rotating horizontally in the book-shaped tank unit; and the water-supplying nozzle is disposed at a boundary portion between the rectangular-shaped upper portion and the cone-shaped lower portion;

the water-supplying nozzle spouts out with water downwardly in order to force the rotating water stream downwardly; and the water is drained out from the bottom hole after rotating along side walls of the cone-shaped lower portion.

10. The method according to claim 9, wherein the water-supplying nozzle is disposed at a corner between adjacent two side walls of the rectangular-shaped upper portion.

11. A method for processing a large number of fish eggs, comprising the steps of:

an egg-producing step for producing fish eggs by lighting up a water tank apparatus accommodating fishes;

an egg-collecting step for collecting the fish eggs from drainage drained out from the water tank apparatus;

an egg-arranging step for arranging the collected fish eggs at a predetermined positions capable of injecting gene material into the fish eggs; and an injecting step for injecting materials into the arranged fish eggs in turn;

wherein the water tank apparatus includes a plurality of tank units accommodating a plurality of fishes each;

each tank unit has each bottom hole for draining water in each tank unit;

the water in the tank unit is rotated horizontally;

the tank unit has a rectangular-box-shaped upper portion and a cone-shaped lower portion; and the bottom hole is formed at a top of the cone-shaped lower portion.

* * * * *